United States Patent [19]

Wolcott, II

[11] Patent Number: 4,638,833

[45] Date of Patent: Jan. 27, 1987

[54] CHOKE VALVE

[75] Inventor: Herbert A. Wolcott, II, Plano, Tex.

[73] Assignee: Atlantic Richfield Company, Los Angeles, Calif.

[21] Appl. No.: 821,118

[22] Filed: Jan. 21, 1986

Related U.S. Application Data

[63] Continuation of Ser. No. 676,328, Nov. 29, 1984, abandoned.

[51] Int. Cl.$^4$ .............................................. F16K 1/34
[52] U.S. Cl. .................................... 137/312; 137/375; 137/551
[58] Field of Search ........... 137/312, 375, 551, 625.35, 137/625.38; 251/118, 120–122, 205, 206, 333, 215

[56] References Cited

U.S. PATENT DOCUMENTS

| | | | |
|---|---|---|---|
| 2,051,509 | 8/1936 | Wile | 251/333 |
| 2,406,243 | 8/1946 | Newton et al. | 251/333 |
| 2,426,411 | 8/1947 | Peterson et al. | 251/333 |
| 2,507,851 | 5/1950 | Bryant et al. | 251/215 |
| 2,792,845 | 5/1957 | Atherton et al. | 137/375 |
| 2,822,789 | 2/1958 | Philips et al. | 137/375 |
| 3,664,634 | 5/1972 | Guertin et al. | 251/333 |
| 4,136,709 | 1/1979 | Rogers et al. | 137/375 |
| 4,161,187 | 7/1979 | Bauer | 137/375 |
| 4,461,316 | 7/1984 | Cove et al. | 137/312 |

FOREIGN PATENT DOCUMENTS 4422339  7/1964  Japan .................................. 251/333

Primary Examiner—Samuel Scott
Assistant Examiner—Noah Kamen
Attorney, Agent, or Firm—M. David Folzenlogen; Michael E. Martin

[57] ABSTRACT

A flow line control valve is provided with internal erosion and corrosion trim liners and means for detecting for leaks in the liners. There is also provided fuller range, positive shutoff throttle means designed to reduce erosion and corrosion of the throttling parts and valve seat. The low flow rate throttling action is provided by progressive and accumulative flow through one or more stages of throttling flow passages of and by a nose end of the throttling means. Preferably the nose end is concavely tapered. Also preferably two or more stages of throttling spaced apart flow passages of increasing size are employed. Postive long lasting shut-off is assured by combining throttling and seat surfaces of different angles of taper.

5 Claims, 1 Drawing Figure

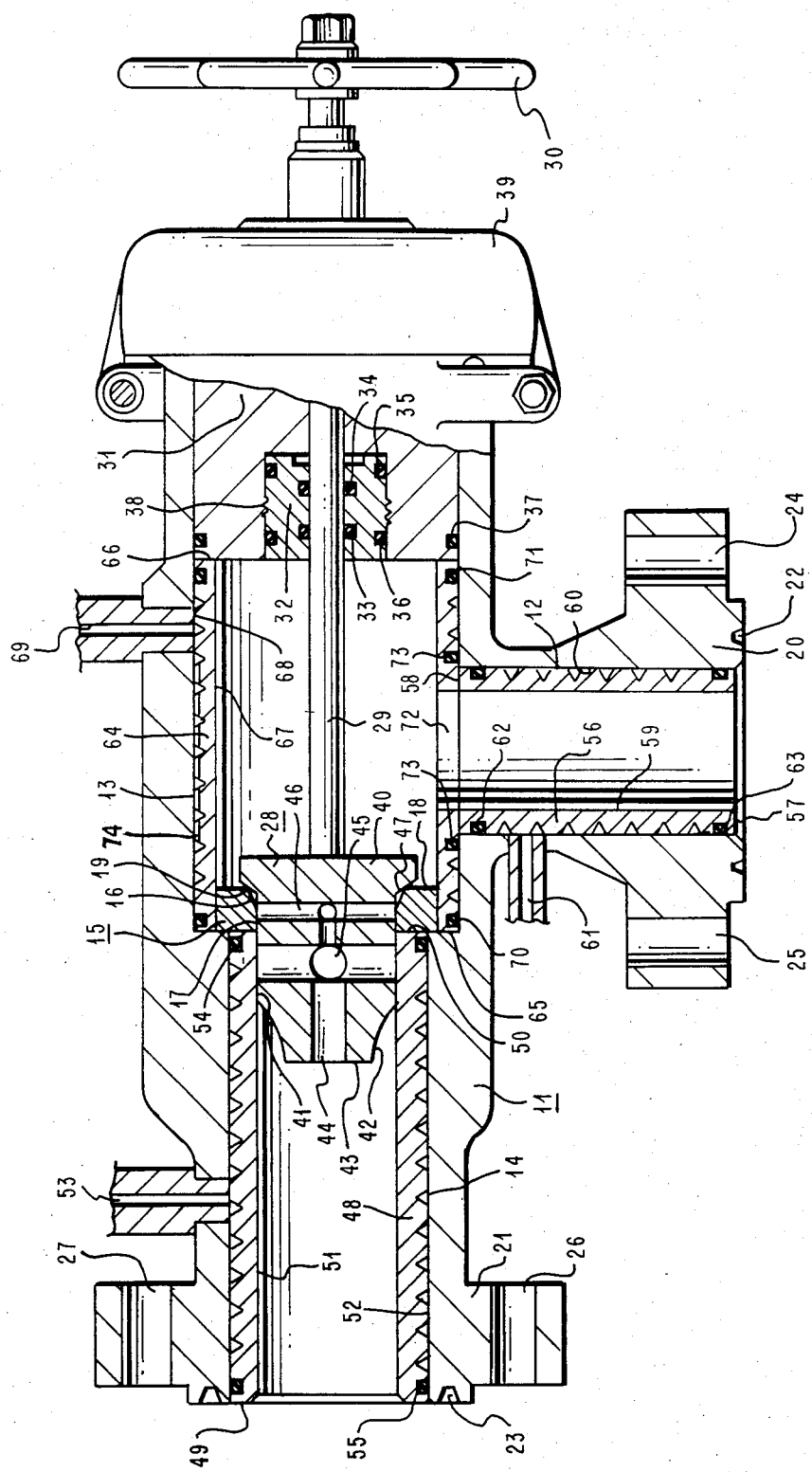

CHOKE VALVE

This application is a continuation, of application Ser. No. 676,328, filed Nov. 29, 1984, now abandoned.

BACKGROUND OF THE INVENTION

This invention relates to a throttling control choke valve. More particularly, this disclosure pertains to a wider operating range choke valve and reduced valve seat and stem seat erosion. The disclosure also pertains to valve body erosion and corrosion resistance and detection.

Variable choke valves or fluid flow regulation valves are used in flow lines leading from oil and/or gas producing wells and sometimes in flow lines leading to water injection wells. These flow line chokes have movable means for varying the amount of restriction to be imposed by the choke on the fluids flowing through the flow line. Three types of movable means are in general use. One type valve uses dual parallel discs with a circular aperature in each disc. The maximum flow rate is dependent on the size of the hole and throttling action is obtained by varying the amount of alignment of the holes. A second type of choke valve uses a cylindrical perforated cage in combination with a cylindrical piston or a cylindrical sleeve. Either the piston or sleeve or the cage is movable to vary the size and number of perforations through which the fluids may flow from the inlet to outlet side of the valve. The third type of valve employs a valve stem with a tapered end which is moved in and out of a similarly tapered member in the valve to vary the amount of opening through which the fluids may flow. This type of choke valve is commonly referred to as a needle and seat valve. Without a change of inner members, these common choke valves have limited effective flow rate range abilities, generally operating between 30% and 80% of full capacity. Ideally a choke control valve should be able to control the flow of liquids and gases, including entrained particles, over a range from a few percent to 90% at variable pressure differentials without the need for changing inner valve choke members. For example, some oil and gas producing operations occur in very cold areas where it is important to maintain sufficient liquid flow, for example, about 5%, to prevent freezing or congealing of the liquid in the line.

The requirements for choke valves are among the most severe, for any valve service choke control valves are subject to greatly aggrevated erosion and/or corrosion of the inner surface of the valve body and the inner valve members in the valve just before, at, and just downstream of the point of throttling. The aggrevated erosion and corrosion is a combination of several conditions. Petroleum fluids frequently contain sand-like mineral particles, brine and acid gases. The erosive and corrosive characteristics of petroleum fluids in throttle valves is aggrevated by the effects of increased fluid turbulence, impingement on metal surfaces and fluid cavitational phenomena. Ideally the valves should have long life and should be easy to maintain. Choke valve designers have tried without total success to eliminate erosion and corrosion. It has become common practice to use erosion and corrosion resistant pistons, sleeves, cages, tapered stem tips, and valve seats made of or plated or lined with tungsten carbide, chrome stainless, stellite and ceramics. It has also become common practice to line the valve body inlet, chamber and outlet with such erosion and corrosion resistant materials. Despite these preventive measures, valve seats and members still continue to erode altering the control characteristics and abilities of the valve and frequently rendering the valve unreliable. In addition, valve bodies still continue to fail. Failures are dangerous, environmentally undesirable and clean ups and repairs costly. Routine X-ray, ultrasound and other procedures for detecting body erosion, pitting or other forms of metal loss are rendered unrealible by the such carbide and other preventive materials. Ideally the choke valve should be designed in a way that minimizes erosion of the critical valve shut off points and of surfaces on the movable part of the valve and on mating seat surfaces. Moreover, ideally metal loss adjacent the inner surfaces of the valve should be detectable before substantial erosion and corrosion of the valve body occurs.

Accordingly, it is the primary object of this invention to provide a variable choke control and shutoff valve leaving the aforementioned ideal charcteristics.

SUMMARY OF THE INVENTION

There are provided several embodiments of a throttle choke control valve for petroleum production and injection wells. In all embodiments the valve has inlet, chamber and outlet sections with valves set and throttle means movably disposed to be moved into and out of the valve set and control flow through the valve. In several variations, the more erosive outlet sections or the other sections or the entire valve body are lined with erosion and corrosion liners in a manner such that if the liners erode or corrode through fluid will pass to one or more monitoring passages and to one or more detection points in the valve body and the maintenance friendly liner or liners may be replaced.

Further embodiments concern a throttle means operable over a wide range of flow rates from a few percent to almost total flow. The throttle means is a special nose piece with at least one throttling flow passage communicating with longitudinal flow passage in the outlet part of the nose piece. More preferably, there are at least two longitudinally spaced apart throttling passages of different size communicating with the longitudinal outlet flow passage in the outlet of the nose piece. The throttling passages act like fixed orifices for the low range of flow rates. These throttling passages also reduce erosion by causing a significant portion of the fluid to impinge upon fluid and lessen erosion of the upper part of the valve seat. Another variation pertains to a tapering positive shut off section of the nose piece upstream of throttling passages inside the nose piece. Unlike prior valves, the positive shut off section tapers at an angle different from a taper in the inlet part of a passage through the valve seat. This causes shut off to occur at the rim edge of the passage through the valve seat where there is no erosion thereby assuring positive shut off after extended use. This tapering arrangement also assures virtually no erosion of the initial part of the valve seat passage increasing the uniform choke action of the nose piece. Still another variation relates to a concavely tapering section of the nose piece downstream of the internal throttling passages. Preferably special choke nose piece is combined with the erosion and corrosion resistant liners previously mentioned.

BRIEF DESCRIPTION OF THE DRAWING

The drawing is a cross-sectional view of the internal features of the flow line choke valve of this invention.

DETAILED DESCRIPTION OF THE INVENTION

Generally speaking, this invention is for a flow line choke control valve for oil and gas production and injection wells.

The drawing shows the choke control valve. The valve comprises valve body means 11 which maybe made of one or more structural elements to define by inner inlet surface 12 an inlet flow passage, and by inner chamber surface 13 a chamber flow passage, and by inner outlet surface 14 and outlet flow passage. Adjacent the point where the inner chamber flow passage defined by inner chamber valve body surface 13 communicates with the outlet flow passage defined by outlet inner body surface 14 is valve seat means 15 with a valve seat flow passage extending therethrough defined by tapering valve seat wall 16 starting at the chamber end of the flow passage and by nontapering valve seat wall 17. The tapering valve seat walls taper at a specific angle with respect to the center line or longitudinal axis of the valve seat means for reasons hereinafter described in detail. Surrounding the flow passage through valve seat chamber inlet end 18 has a substantially flat surface which is substantially perpendicular to the longitudinal axis of the valve seat means and which meets with tapering surface 16 at juncture 19 which as hereinafter described forms the shut off seat of the valve. The internal flow passage through the inlet, chamber, valve seat and outlet of the valves allow fluids to flow from inlet end 20 through the valve body to outlet end 21 in the direction shown. Inlet ends 20 and 21 are adapted in conventional fashion to be connected into a flowline. Typically, the flange type connection with seal means in depressions 22 and 23 and bolt holes 24, 25, 26 and 27 will be used.

Movably disposed within valve seat means 15 and the chamber or throat of the valve is valve throttle means 28 which is adapted to be moved into and out of the valve seat means and to control the rate of fluid flowing through the control valve. The means for moving the throttle into and out of valve seat forms no part of this invention, but for illustrative purposes the throttle means is shown connected to stem 29 which moves into and out of the valve by handle 30. The stem is supported by conventional chamber end plug means 31 with conventional stem sealing means 32 with stem sealing rings 33 and 34 and outer inner seal rings 35 and 36 and outer seal ring 37. The stem seals and plug means may be held in place in any conventional fashion, e.g., screw plugs, set screws etc. For illustrative purposes, it is shown held in place by threads 38. For illustrative purposes, typical nibolt type retention system 39 is shown.

Throttle means 28 is shown with optional enlarged chamber end 40. The throttle means is also shown with a nose piece defined by outer wall surface 41, tapering wall suface 42 and outlet end surface 43. Tapering wall surface 42 is preferably concavely shaped. The longitudinal length of nose piece surfaces 41 and 42 must be at least one half inch for reasons hereinafter made apparent. The nose piece has centrally located flow passage 44 extending longitudinally from outlet end 43 toward the chamber part of the valve body. This central nose piece flow passage communicates with at least one first throttling flow passage 45 which extends from central passage 44 outwardly through outer nontapering surface 41 of the nose piece to the flow passage passing through the valve seat means. Preferably central flow passage 44 will also communicate with at least one second throttling flow passage 46 which extends from the central flow passage outwardly through outer surface 41 of the nose piece to the flow passage passing through the valve seat means. Throttling flow passages 45 and 46 are shown in the form of a cross, but central flow passage 44 and throttling flow passage 45 and central flow passage 44 and throttling flow passage 46 may be T-shaped, L-shaped, Y-shaped or any other shape. The throttling flow passage or passages could also be a ring of 6 to 20 or more flow passages. A T-shape or double T-shape or a greater number of radial flow passages is preferred since this causes the greatest amount of radial fluid flow into the throttling passages and the greatest amount of fluid impinging on fluid to reduce erosion of the valve. For reasons hereinafter made apparent, first throttling flow passage 45 is adapated to conduct a greater rate of fluid flow than second throttling flow passage 46 and the inlet of the second throttling flow passage is paced longitudinally further from nose piece outlet end 43.

As shown, the cross section of the nose piece optionally tapers to a smaller size cross section starting at a point spaced longitudinally toward outlet end 21 of the valve body from first throttling flow passage 45. As previously noted, tapering surface 42 is preferably concavedly shaped for throttling. This reduces erosion in the valve seat and in the outlet of the valve. More importantly it lessens the chances of erosion of surface 16 and surface 17 of the valve seat means 15.

At a point longitudinally toward the chamber of the valves from second throttling passage 46, throttle means 28 tapers or enlarges to a larger predeterimined size which is larger than the flow passage through valve seat means 15. The taper is at a specified angle with respect to the centerline or longitudinal axis of the valve seat means. This angle of taper must be greater than the angle of taper of valve seat means tapering surface 16. In this way when throttle means 28 is moved into the valve seat means, tapering surface 47 of the throttle means is adapted to contact valve seat means 15 at rim juncture 19. This part of the valve seat means is not erroded thereby assuring positive shut off of the valve even after extended use.

Inside the outlet flow passage of the valve body defined by inner outlet body surface 14 is outlet liner means 48 having outer liner end 49 and inner liner end 50. The outlet liner has inner surface 51 defining a central outlet liner flow passage extending through outlet liner means 48. Outer surface 52 of the outlet liner and inner outlet surface 14 are adapted to define an outlet monitoring flow passage behind the liner. This flow passage is designed to permit monitoring for a hole or leak in outlet liner means 48. Communicating with this outlet monitoring passage is flow passage 53 through the outlet part of the valve body. The passage is monitored for fluids leaking through a hole in the liner. This may be accomplished in any known way, for example, pressure means, chemical means or electrical means. The test flow passage will be adapted accordingly. Near inner end 50 of outlet liner 48 is inner outlet liner sealing means 54 adapted to form a fluid tight seal between outer surface 52 of the liner and inner outlet surface 14 of the valve body. Any type of sealing means may be used, for example, seal rings, threads or tapered surfaces. Similarly near outer end 49 of liner 48 is outer oulet sealing means 55 adapted to form a fluid-tight seal between outer surface 52 of the liner and inner outlet surface 14 of the valve body. The type of seal used will depend on the final valve configuration. Usually seal rings like O-rings will be used. The sealed monitoring passage may be formed in any suitable fashion. It is preferred that the liner be press fitted into the valve body. Therefore, the monitoring flow passage is shown as being formed by a spiralling groove created around the outer surface of the liner.

In a similar fashion inside the inlet flow passage of the valve body defined by inner inlet body surface 12, there is shown optional inlet liner means 56 having outer liner end 57 and inner inlet liner end 58. The inlet liner has inner surface 59 defining a central inlet liner flow passage extending through inlet liner means 56. Outer surface 60 of the inlet liner and inner inlet surface 12 are adapted to define an inlet monitoring flow passage behind inlet liner means 56. This flow passage is designed to permit monitoring for a hole or leak in inlet liner means 56. Communicating with this inlet monitoring passage is flow passage 61 through the inlet part of the valve body. The passage is monitored for fluids leaking through the liner. This may be accomplished in any known way, for example, pressure means, chemical means or electrical means. This test flow passage will be adapted accordingly. Near inner end 58 of inlet liner means 56 is inner inlet sealing means 62 adapted to form a fluid tight seal between outer surface 60 of the liner and inner inlet surface 12 of the valve body. Any type of sealing means may be used, for example, seal rings, threads or tapered surfaces. Similarly near outer end 57 of liner 56 is outer inlet sealing means 63 adapted to form a fluid tight seal between outer surface 60 of the liner and inner inlet surface 12 of the valve body. The type of seal used will depend on the final valve configuration. Usually seal rings like O-rings will be used. The sealed monitoring passage way is formed in any suitable fashion. It is preferred that the liner be press fitted into the valve body. Therefore, the monitoring flow passage is shown as being formed by a spiralling groove created around the outer suface of the liner.

Optional chamber liner means 64 is shown inside chamber flow passage of the valve body defined by inner chamber body surface 13. The chamber liner means has ends 65 and 66 and inner surface 67 which defines a central chamber liner flow passage extending through chamber liner means 64. This flow passage communicates with the flow passage through valve seat means 15. Outer suface 69 of the chamber liner and inner chamber surface 13 of the valve body are adapted to define a chamber monitoring flow passage behind the liner. This flow passage is designed to permit monitoring for a hole or leak in chamber liner means 64. Communicating with this chamber monitoring passage is flow passage 69 through the chamber part of the valve body. The passage is monitored for fluids leaking through the liner. This may be accomplished in any known way, for example, pressure means, chemical means or electrical means. This test flow passage will be adapted accordingly. Near end 65 of the chamber liner means 64 is sealing means 70 adapted to form a fluid-tight seal between outer surface 68 of the liner and inner chamber surface 13 of the valve body. Similarly, near end 66 is sealing means 71 adapted to form a fluid-tight seal between outer surface 68 of the liner and inner chamber surface 13 of the valve body. Any type of sealing means may be used, for example, seal rings, threads or tapered surfaces. The type of seal used will depend on the final valve configuration. Usually seal rings like O-rings will be used. Chamber inlet liner means 64 has aperture 72 through the wall of the chamber liner means. The aperture communicates with the central flow passage in the liner and with the inlet flow passage in the inlet of the valve body or the central flow passage of inlet liner means 56 whichever is applicable. Surrounding aperture 72 is sealing means 73 adapted to form a fluid-tight seal between outer surface 68 of the chamber liner surfaces and inner surface 13 of the body. The sealed monitoring passage may be formed in any suitable fashion. The monitoring flow passage is shown as being formed by grooves around the outer surface of the liner. However, since aperture 72 interrupts the spiralling path, the spiralling grooves are shown interconnected by groove 74 running longitudinally of the liner.

The valve seat means, the throttle means and the liner may be made of erosion and corrosion resistant materials like tungsten carbide, stellite, stainless steels, such as 316 or 174-PH ceramics, 12 chromium, or other materials treated with a hardening process such as gas diffusion processes or coated or lined with these materials. Moreover, the surfaces may be coated with other corrosion resistant materials. In this way, the entire valve body or only the parts subjected to the greatest erosion may be trimmed with erosion-resistant materials and the continuity of the trim monitored for holes or leaks.

In operation, when the choke control valve is installed in the shut off position with fluid pressure in the inlet and chamber of the valve, fluid flow is prevented by contact between rim juncture 19 of valve seat means 15 and tapered surface 47 of throttle means 28. When valve stem 29 pulls the throttle means into valve chamber, the shut off seat is broken and fluid flows between tapered surface 16 of the valve seat means and tapered surface 47 of the throttle means. If the throttle means is moved far enough, the first throttling stage of the control valve is activated. This first stage is represented by smaller throttling flow passage 46 which communicates with central flow passage 44. Optional throttling flow passage 45 remains shut off by inner nontapering valve seat wall 17. Smaller throttling flow passage 46 acts like a fixed orifice and in most cases will be designed to give a right amount of small flow without partial eclipse. For example, the flow will be designed to prevent freezing or congealing of fluids inside the flow line. It is contemplated that this flow will be around 3% to 7% in rigidly cold areas. When the throttle means is opened, the fluid flows radially into flow passages 46. The fluid impinges upon itself at the juncture of flow passage 46 and central flow passage 44. This fluid on fluid impingement reduces erosion in the throttling means and dissipates some of the erosion energy in fluid before it passes through and out of central flow passage 44 to the outlet end of the valve.

When the throttle means is moved further out of valve seat means 15, the second stage of the choke control is activated as throttling flow passage 45 is moved past inner nontapering wall 17 and adjacent tapering wall 16. The second stage is of the same general design as the first stage but it is larger and flow through the second stage is combined with the fluid flowing in the smaller first stage. Moreover, fluid from the first stage impinges on fluid flowing radially in the second stage. The flow rate in the second stage can be fine tuned by eclipsing part of throttle flow passage 45. This second stage provides throttling action over flow rates ranging between the first stage and the other stages of the control valve. Other intermediate stages may be added by adding throttling flow passages.

When throttling means is moved further out of the valve seat, tapered surface 42, preferably concave, moves into the tapered area of valve seat means 15 and flow through the first and second states is combined with flow between the concave surface and inner surface nontapering valve seat surface 17 until the throttle means is completely out of the valve seat means. This reduces the chances of erosion of the throttling surfaces and provides virtually full range control with reduced erosion and corrosion. Any erosion that does occur will occur toward the outlet of the valve away from rim juncture 19, tapered surface 16, and the top part of nontapered surface 17 thereby assuring more reliable throttle and shut action of the valve over a longer period of time. There is also less pressure drop through the throttling means of the valve at full open, less direct solids impingement on valve surfaces, and the valve is self cleaning of solids. If erosion of one or more of the liners 48, 56 or 64 occurs and a hole is formed in a liner, fluid leaks into the appropriate monitoring passage which serve to conduct the fluid to the appropriate test arrangement through the wall of the valve body. All of the monitoring passages could be interconnected and only one test arrangement used, but use of three separate trim liners and monitoring flow passages helps to isolate the point of trouble if the valve is made up of separate parts.

Having illustrated and described embodiments of this invention in some detail, it will be understood that these descriptions and illustrations have been offered by way of example only and that the invention is to be limited in scope only by the appended claims.

I claim:

1. A well flow line choke control valve comprising:
   valve body means including a valve inlet flow passage adapted to be connected to a flow line, an inner surface defining a valve chamber, and a valve outlet flow passage adapted to be connected to a flow line;
   valve seat means disposed in said body between said inlet flow passage and said outlet flow passage, said valve seat means having a valve seat flow passage extending therethrough;
   valve throttle means adapted to be moved relative to said valve seat means and to control the rate of fluid flowing through said control valve;
   liner means inside said valve body, said liner means having opposed ends and an inner surface defining a liner flow passage,
   an inner surface of said valve body and an outer surface on said liner means adapted to define a monitoring flow passage for monitoring for a leak in said liner means, said monitoring flow passage being further defined by a spiralling groove formed in said outer surface on said liner means to provide for supportive engagement of said liner means between said inner surface of said valve body and said outer surface of said liner means;
   a flow passage extending through said valve body and communicating with said monitoring flow passage; and
   sealing means adapted to form a fluid-tight seal near respective ones of said ends of said liner means between said liner means and said valve body.

2. The control valve of claim 1 wherein:
   said liner means comprises chamber liner means disposed inside said valve chamber, said chamber liner means having first and second chamber liner ends and an inner chamber liner surface, said inner chamber liner surface defining a chamber liner flow passage, a cylindrical section of said chamber liner means traversing said inlet flow passage in said valve body and having a chamber liner aperture through the wall of said cylindrical section of said chamber liner means, said chamber liner aperture communicating with said chamber liner flow passage and with said inlet flow passage in said valve body, and sealing means adapted to form a fluid-tight seal surrounding said chamber liner aperture between an outer chamber liner surface and said inner surface defining said chamber of said valve body.

3. The control valve of claim 2 including:
   groove means extending longitudinally of said chamber liner means and forming a part of said monitoring flow passage and coextensive with said chamber liner aperture.

4. The control valve of claim 2 including:
   inlet liner means inside said inlet passage in said valve body, said inlet liner means having an inner inlet liner end and an outer inlet liner end, said inlet liner means having an outer inlet liner surface and an inner inlet liner surface, said inner inlet liner surface defining a central inlet liner flow passage extending through said inlet liner means, an inner surface of an inlet part of said valve body and said outer inlet liner surface being adapted to define an inlet monitoring flow passage for monitoring for leaks in said inlet liner means, a flow passage extending through said inlet part of said valve body and communicating with said inlet monitoring flow passage, inner sealing means adapted to form a fluid-tight seal near said inner end of said inlet liner means between said inlet liner means and said valve body and outer sealing means adapted to form a fluid-tight seal near said outer end of said inlet liner means between said inlet liner means and said valve body.

5. The control valve of claim 1 wherein said liner means is disposed is said outlet passage in said valve body, said liner means having an inner liner end and an outer liner end, said liner means having an inner liner surface defining a central liner flow passage extending through said liner means.

* * * * *